March 8, 1949. J. A. E. CARLSON 2,464,175
TRANSMISSION FOR POWER LAWN MOWERS
Filed Nov. 10, 1944 2 Sheets-Sheet 2

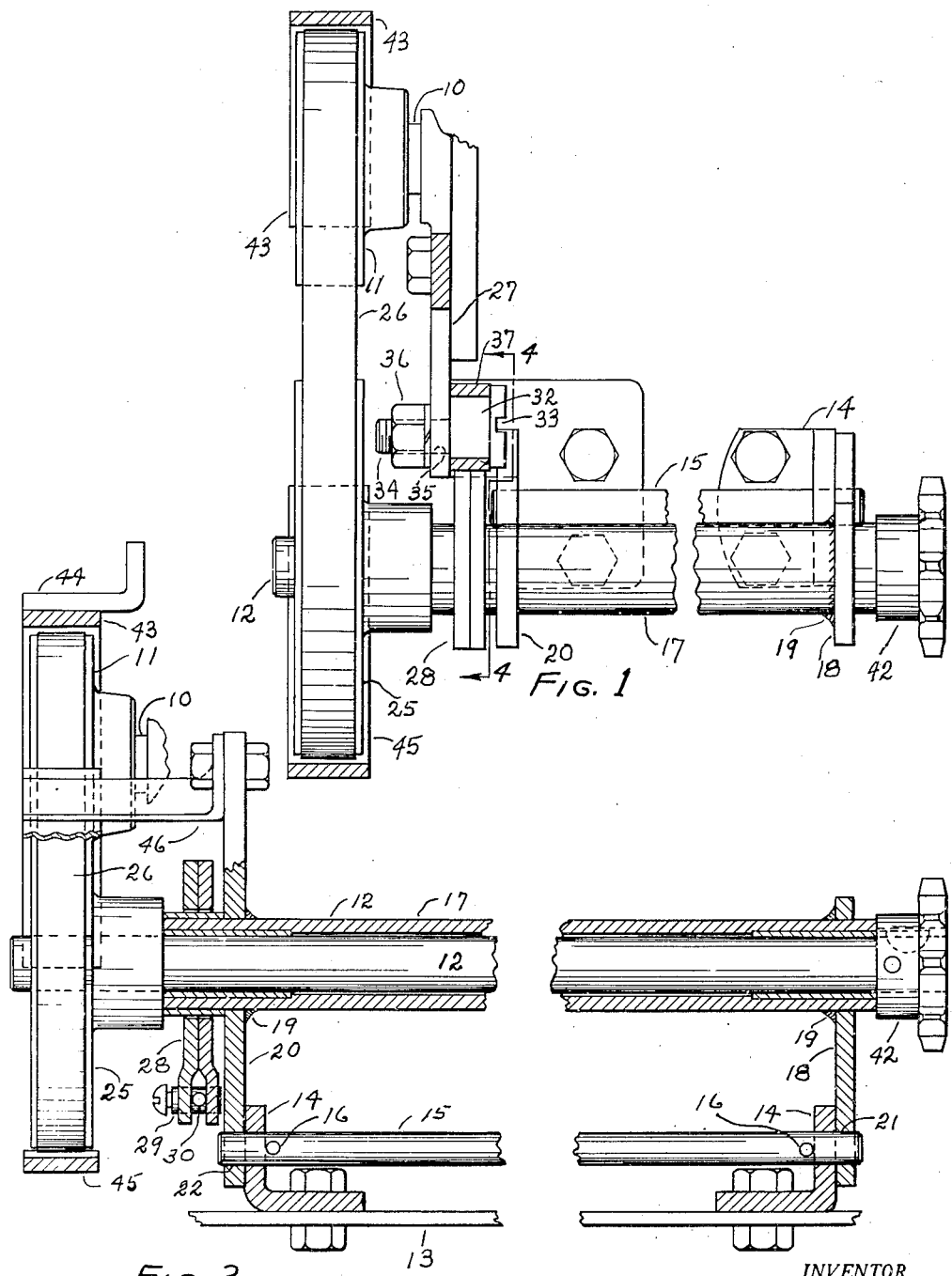

INVENTOR.
J. A. EDWIN CARLSON
BY
ATTORNEY

Patented Mar. 8, 1949

2,464,175

UNITED STATES PATENT OFFICE 2,464,175

TRANSMISSION FOR POWER LAWN MOWERS

J. A. Edwin Carlson, Racine, Wis., assignor to Jacobsen Manufacturing Company, Racine, Wis., a company of Wisconsin Application November 10, 1944, Serial No. 562,842

4 Claims. (Cl. 74—242.16)

1

The present invention relates to a belt transmission which is particularly adapted for use on power driven lawn mowers and the like, and having means associated therewith which answers the purpose of a clutch, operable by remote control preferably by means of a Bowden wire.

For power lawn mowers, particularly the hand guided type, which are driven by small internal combustion engines which not only furnish the power for driving the blade carrying reel but also the motive power for the ground wheels, wherein the operator has nothing to do except to guide and start and stop the device, applicant's invention is particularly suited.

For devices of the class, I provide the simplest form and easiest to operate transmission, by providing a V belt drive wherein the pulleys are relatively close together and where the starting and stopping is accomplished by tightening and loosening the belt.

In applicant's device, starting and stopping are accomplished by the use of far less energy than when a clutch is used. The first cost is far less and adjusting is simpler and easier to accomplish than with a clutch system.

To these and other useful ends, my invention consists of parts, combinations of parts or their equivalents, and mode of operation as hereinafter described and claimed and shown in the accompanying drawings in which:

Fig. 1 is a fractional top view of my improved device as applied to lawn mowers.

Fig. 2 is a rear view of the device similar to that shown in Figure 1, and as attached to the mower frame plate.

Figure 3:
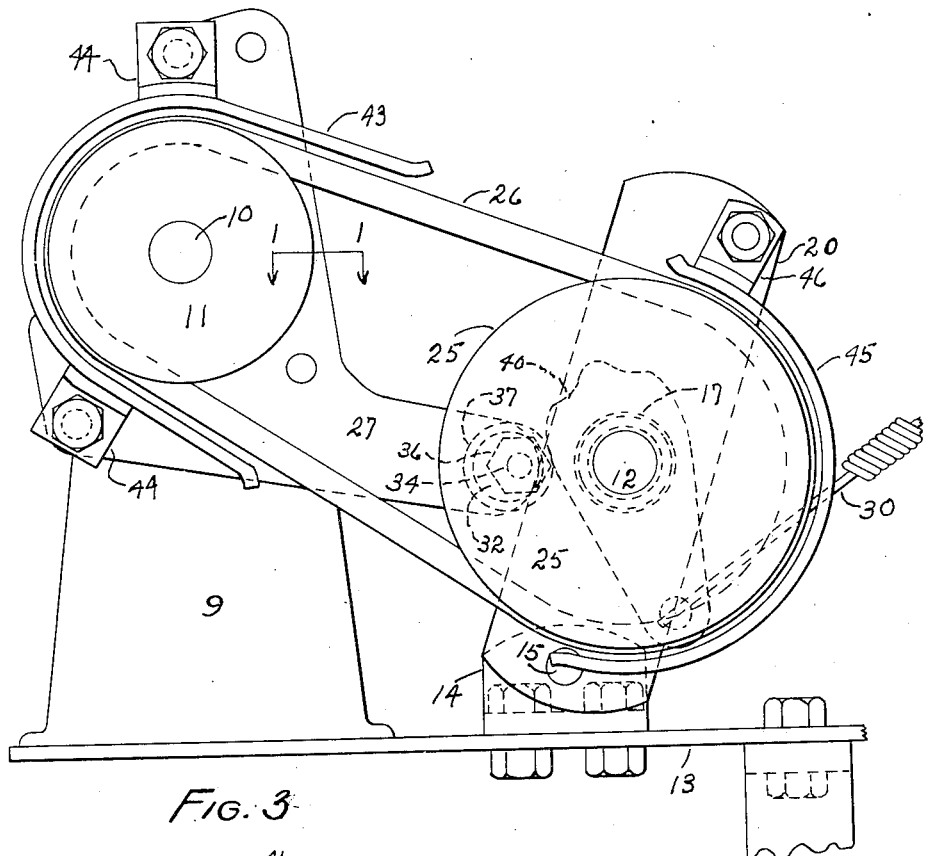
Fig. 3 is a left hand end view of the device.

As thus illustrated, the device is adapted to form an operating connection between the engine crank shaft and a secondary or drive shaft. In the drawings, the engine crank shaft is designated by reference character 10, to which a V belt driving pulley 11 is attached. The secondary shaft 12 is rotatably mounted on a mower base plate 13 as follows:

Spaced brackets 14—14 are secured to plate 13 as clearly illustrated in the figures. A shaft 15 is slidably mounted in the upwardly extending portions of members 14 and held in working position by means of cotter pins as at 16—16. A tube 17 is rigidly secured at its right end to a post 18 as at 19, the left end of the tube being rigidly secured to a post 20 as at 19. Posts 18

2 and 20 are pivoted at their lower ends to shaft 15 as at 21 and 22. Thus it will be seen that tube 17 may be moved forwardly and rearwardly on shaft 15 as an axis.

Shaft 12 is rotatably mounted in tube 17 as clearly illustrated in Figure 2, having a V belt pulley 25 secured to its left hand end. A V belt 26 forms an operating connection between pulleys 11 and 25 and when shaft 12 is in the position shown, this belt is loose enough to slip for idling speed of the engine.

The means for tightening the belt for operating the mower consists of a bracket 27 which is suitably secured to the engine. A lever 28 is pivotally mounted on tube 17 having a suitable means as at 29 at its bottom to which preferably a Bowden wire 30 may be secured, this connection being pivotally mounted in openings 31.

Figure 4:
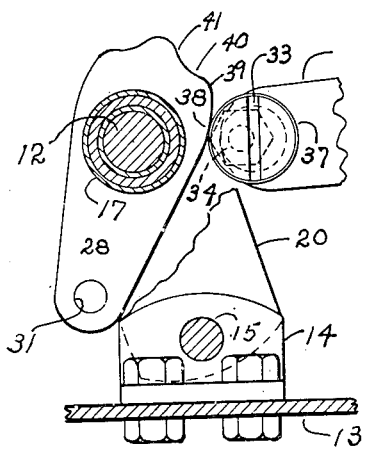
Fig. 4 is a view of the device taken from line 4—4 of Figure 1.

On the rear end of member 27 I turnably mount a member 32, the head of which is provided with a screw-driver slot 33. Member 32 is provided with a pintle 34 which is considerably offset as shown in Figure 1, and extending through an opening 35 in member 27. This pintle is supplied with a lock washer and nut 36 so member 32 can be turned and locked in any desired position. Member 32 carries a roller 37 and lever 28 is shaped as shown in Figure 4 so that when the front surface at 38 lays on the roller member 32 will be adjusted to a position which will permit the belt to slip freely for free idling of the engine.

A cam surface 39 terminates into a slight depression 40 and continues so as to form a raised surface 41, the shape of the surfaces 40 and 41 being similar to the outside diameter of roller 37. It will be noted that the engine base, designated by reference character 9, is mounted on base plate 13 and that member 27 is therefore held rigid relative to base plate 13.

Thus when the operator pulls rearwardly on Bowden wire 30 cam surface 39 will cause tube 17 to move rearwardly on shaft 15 as an axis and tighten the belt enough to drive the mower. The slight depression at 40 will prevent the clutch from being accidentally disengaged and the surface 41 will limit the travel of lever 28; thus engaging and disengaging the clutch or belt will be brought about by pulling and pushing on the Bowden wire 30.

It so happens that a V belt slips readily and with very little friction when slightly loose and that very little tension will cause the belt to grip the pulley for maximum power transmission. The design of my device prompts the operator to adjust the belt so it will be only tight enough to transmit maximum power and when it is noticed by the operator that the belt is not tight enough it is a simple matter to loosen and turn member 32 on its eccentric pintle 34.

In hand guided power driven mowers it is the custom to chain drive the blade carrying rotator and drive the ground wheels by means of clutches on the ends of the rotator shaft. In my device I provide a sprocket 42 on the right hand end of shaft 12 and drive the rotator from this sprocket by means of a suitable chain. This driving means associated with the rotator is too well known to require illustration and description.

Referring now to Figure 3; I provide a shield 43 for the forward end of belt 26 and pulley 11, this shield being secured preferably to the engine bed by means of brackets 44—44. I provide a shield 45 for the rear end of belt 26 and pulley 25 and secure this shield to post 20 by means of a bracket 46.

It will be seen that the belt will at all times be in view of the operator and that shields 43 and 45 can be easily removed for changing a belt and that practically the only part of the transmission which is subject to wear is the belt, which is inexpensive and easily replaced. Clearly applicant's transmission may be used other than on power driven lawn mowers and many minor detailed changes may be made in the design without departing from the spirit and scope of the invention as recited in the appended claims.

Having thus shown and described my invention I claim:

1. A transmission of the character described, comprising closely spaced driver and driven V belt pulleys and an endless belt therefor, said driven pulley having a shaft rotatably mounted on a pivoted frame, whereby the shaft may be moved for tightening and loosening the belt, an eccentrically mounted member having thereon a rotatably mounted sleeve positioned in front of said shaft, a lever member rotatably mounted near its upper end concentric with said shaft the upper end of which is cam shaped, manual means for operating said cam, whereby when the lower end of the lever is moved rearwardly the cam will engage the roller and push the shaft rearwardly and hold the shaft in its operating position.

2. A device as recited in claim 1; said frame comprising a tube into which said shaft is rotatably mounted and having secured to its ends depending arms, stationary brackets to which the lower ends of said depending arms are pivoted, whereby the shaft may oscillate forwardly and rearwardly on said pivots, means secured at its forward end to the lower end of said lever and extending rearwardly and upwardly to thereby provide remote manual control over the position of said first shaft.

3. A transmission of the character described, comprising a base plate, a driving shaft rotatably mounted on said base plate and having a V belt driving pulley, a driven shaft rotatably mounted in a tube and having a V belt driven pulley secured thereto in alignment with said driving pulley, said tube having rigidly secured thereto depending arms which are pivotally mounted at their lower ends to said base plate, a V belt operatively engaging said pulleys, a depending control lever rotatably mounted on said tube adjacent the driven pulley, the lower end of said control lever having secured thereto means for manual remote control, a bracket secured to the engine mounting of the driven shaft and near the driven shaft, a stud having an eccentrically positioned pintle extending through said bracket and means on said pintle for holding the stud on the bracket in its adjusted position, a sleeve rotatably mounted on said stud, the upper end of said depending lever adapted to act as a cam and rest on said sleeve, whereby when the lower end of the control lever is in its forward position said belt will be loose and when its lower end is moved rearwardly the cam will act on said sleeve to tighten the belt and whereby the tautness of the belt may be adjusted by turning said stud on its pintle.

4. A device as recited in claim 3; said cam having a slight depression into which said sleeve will rest when the control lever is moved to an operating position and means on said cam adapted to limit the movement of the control lever after the sleeve enters the depression.

J. A. EDWIN CARLSON.

REFERENCES CITED

The following references are of record in the file of this patent:

UNITED STATES PATENTS

| Number | Name | Date |
|---|---|---|
| 973,426 | Harley | Oct. 18, 1910 |
| 1,708,903 | Schroder | Apr. 9, 1929 |
| 1,913,040 | Pierson | June 6, 1933 |
| 2,047,362 | Dunford | July 14, 1936 |